United States Patent
Gschwind et al.

(10) Patent No.: US 7,725,659 B2
(45) Date of Patent: May 25, 2010

(54) ALIGNMENT OF CACHE FETCH RETURN DATA RELATIVE TO A THREAD

(75) Inventors: Michael Karl Gschwind, Chappaqua, NY (US); Hans Mikael Jacobson, White Plains, NY (US); Robert Alan Philhower, Valley Cottage, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/850,410

(22) Filed: Sep. 5, 2007

(65) Prior Publication Data

US 2009/0063818 A1    Mar. 5, 2009

(51) Int. Cl.
   *G06F 12/00* (2006.01)
(52) U.S. Cl. .................. 711/138; 711/123; 711/125; 711/140; 711/154; 712/204; 712/207; 718/106
(58) Field of Classification Search ................. None
   See application file for complete search history.

(56) References Cited

U.S. PATENT DOCUMENTS

| | | | |
|---|---|---|---|
| 5,815,727 A | 9/1998 | Motomura | |
| 5,845,100 A | 12/1998 | Gupta et al. | |
| 6,212,603 B1 | 4/2001 | McInerney et al. | |
| 6,865,665 B2 | 3/2005 | Jarvis | |
| 6,920,549 B1 | 7/2005 | Ukai | |
| 7,003,650 B2 | 2/2006 | Babaian et al. | |
| 7,065,665 B2 | 6/2006 | Jacobson et al. | |
| 7,555,504 B2 * | 6/2009 | Bixby et al. | ................ 707/203 |
| 2006/0031810 A1 | 2/2006 | Peng et al. | |

OTHER PUBLICATIONS

Michael Gschwind, "Chip Multiprocessing and the Cell Broadband Engine," ACM Computing Frontiers, 2006, 44 pages.

* cited by examiner

*Primary Examiner*—Jack A Lane
(74) *Attorney, Agent, or Firm*—Brian P. Verminski; Ryan, Mason & Lewis, LLP

(57) ABSTRACT

A method of obtaining data, comprising at least one sector, for use by at least a first thread wherein each processor cycle is allocated to at least one thread, includes the steps of: requesting data for at least a first thread; upon receipt of at least a first sector of the data, determining whether the at least first sector is aligned with the at least first thread, wherein a given sector is aligned with a given thread when a processor cycle in which the given sector will be written is allocated to the given thread; responsive to a determination that the at least first sector is aligned with the at least first thread, bypassing the at least first sector, wherein bypassing a sector comprises reading the sector while it is being written; and responsive to a determination that the at least first sector is not aligned with the at least first thread, delaying the writing of the at least first sector until the occurrence of a processor cycle allocated to the at least first thread by retaining the at least first sector in at least one alignment register, thereby permitting the at least first sector to be bypassed.

21 Claims, 12 Drawing Sheets

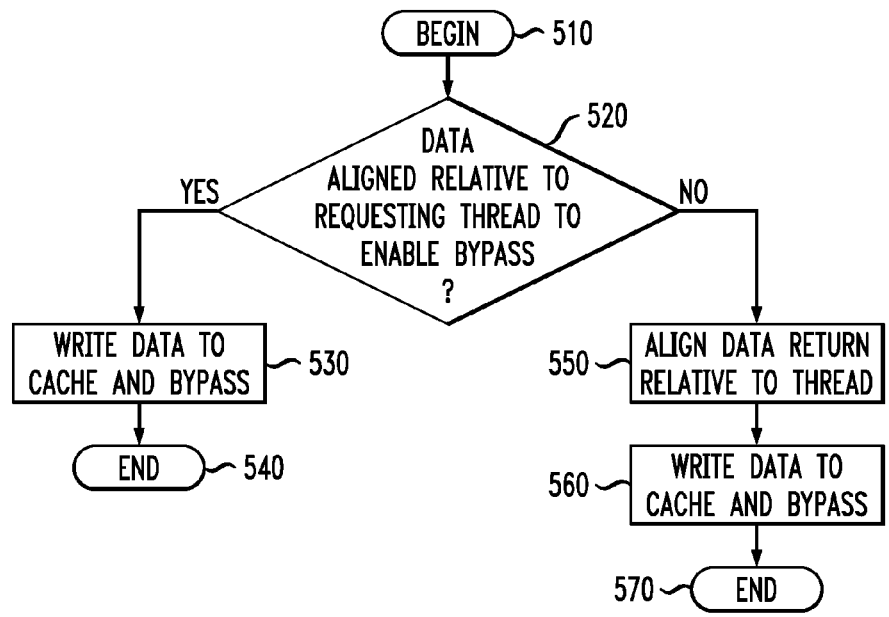
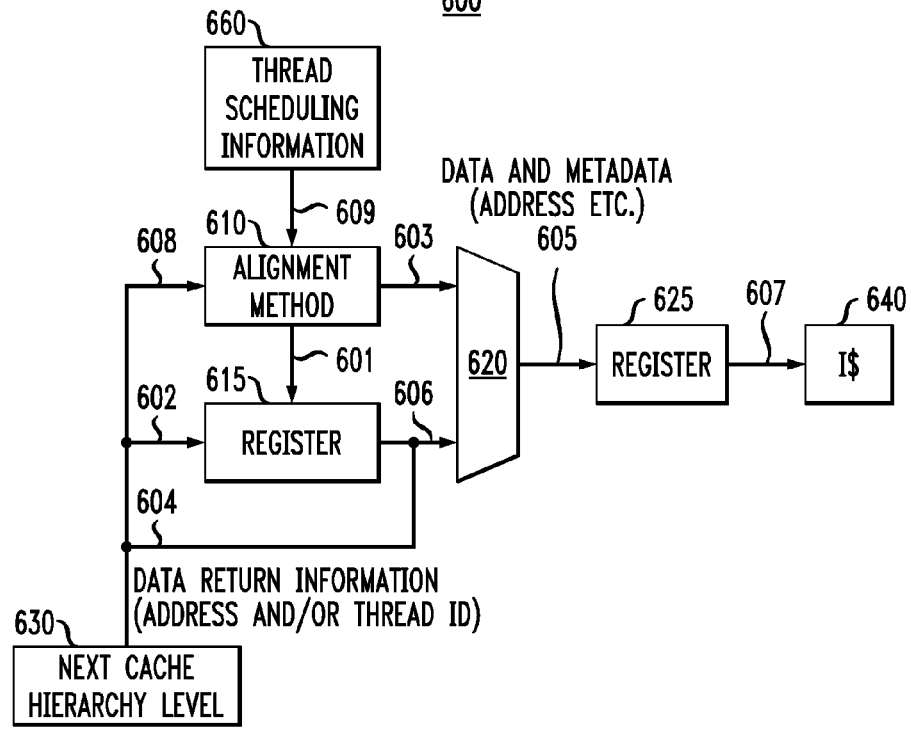

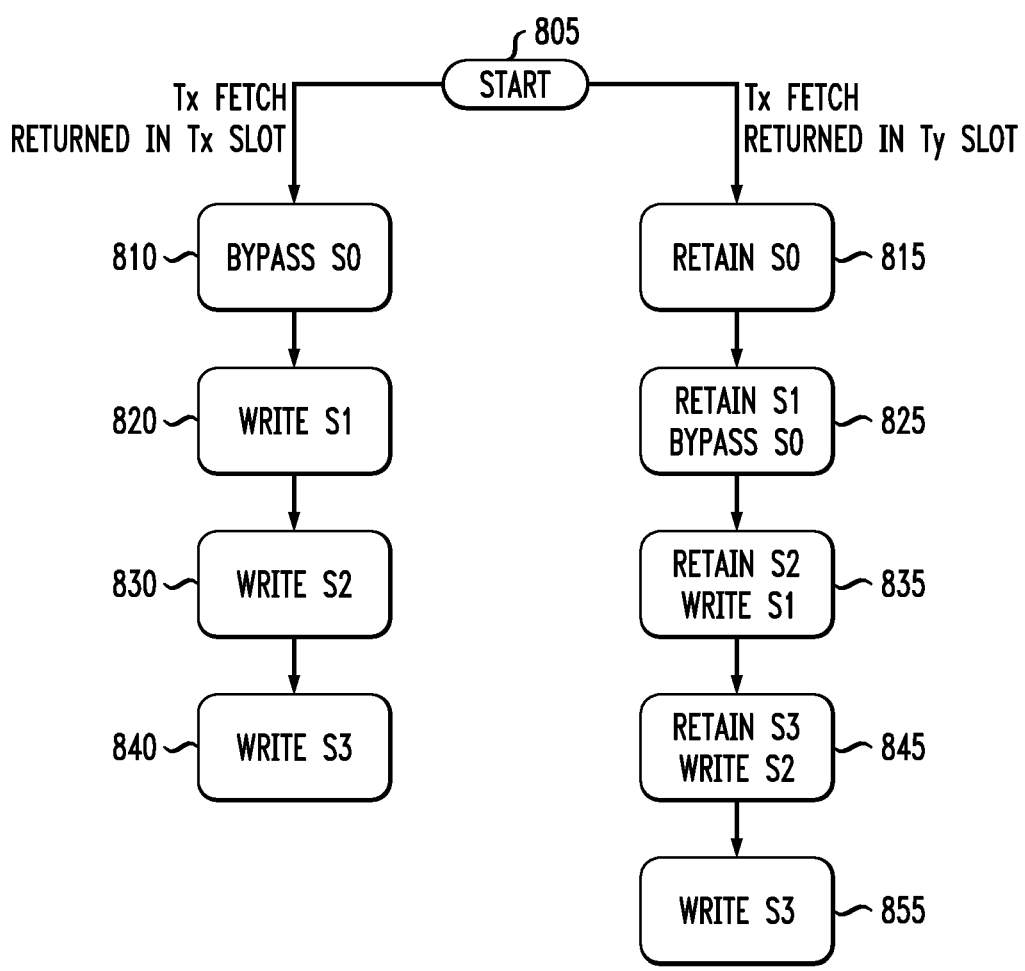

1100

ALIGNMENT OF CACHE FETCH RETURN DATA RELATIVE TO A THREAD

FIELD OF THE INVENTION

The present invention relates generally to techniques for use in a processor, and more particularly relates to instruction fetch and instruction cache reload.

BACKGROUND OF THE INVENTION

A thread, in the context of computer science, generally refers to a thread of execution. Threads are a way for a program to divide itself into two or more simultaneously (or near simultaneously) running tasks. Multiple threads can be executed in parallel on many computer systems, a process often referred to as hardware multithreading. Hardware multithreading is an attractive technology to increase microprocessor utilization. By interleaving operations from two or more independent threads, even if a particular thread is stalled waiting for high-latency operations, functional units can be utilized by other threads.

As described in Michael Gschwind, "Chip Multiprocessing and the Cell Broadband Engine," ACM Computing Frontiers 2006, the disclosure of which is hereby incorporated by reference, multithreading, as a design feature, has become particularly attractive in recent years to tolerate the increasing latency of memory operations, to increase the number of parallel memory transactions, and to better utilize the available memory bandwidth offered by a microprocessor, While hardware multithreading offers attractive aspects of increased memory-level parallelism, thread-level parallelism and better microprocessor utilization, among other benefits, care must be taken to ensure that design of multithreaded microprocessors does not degrade overall performance by introducing additional design complexity which will degrade either clock frequency or the latency of pipelines by introducing additional stages.

An example of this tradeoff is the scheduling of threads for access to specific resources. On the one hand, full flexibility and dynamic scheduling decisions based on core utilization factors and thread readiness increase the ability to perform useful work. On the other hand, this flexibility increases the control overhead and puts scheduling logic in the critical path of each operation step in the microprocessor front-end.

In one design approach, at least a portion of the microprocessor, such as the microprocessor front-end responsible for fetching instructions, uses one of various static access schemes. In one static access scheme, threads are statically interleaved on alternating cycles. In yet other schemes, other static access patterns, e.g., also including thread priorities and so forth, can be provided. However, when using any statically determined threading scheme, access to resources can suffer when statically determined access patterns do not align with resource availability.

To mitigate any potential performance degradation based on this limitation, some embodiments for instruction caches may support instruction cache bypass, wherein data being written into the instruction cache can also be simultaneously fetched by a thread. This is advantageous, as a thread having caused an instruction miss is typically idle until said data returns, and providing data corresponding to the address having previously caused an instruction miss will allow the stalled thread to continue fetching, decoding and executing instructions when its queues would otherwise have been drained.

However, when static thread scheduling for instruction fetch is combined with a restricted cache access and bypass architecture as described hereinabove, degradation can ensue when a thread cannot bypass data during the data return cycle because it is not scheduled in accordance with the thread access policy, and misses the instruction fetch access opportunity to bypass the returned data in response to a cache miss. A thread having missed this bypass opportunity will then have to restart accesses after instruction cache writes have completed, instruction cache writes typically being of higher priority than instruction fetch accesses, and thereby suffer considerable program degradation.

In another aspect of instruction fetch, namely, instruction fetch of caching inhibited storage, in accordance with the definition of architectures such as the state-of-the-art industry-standard Power Architecture, cache inhibited accesses cannot be stored and retrieved from the cache. Instead, cache inhibited accesses must always use the bypass path, and hence cannot be reliably performed in the described environment.

Attempts have been made to address these performance issues in a variety of ways, including the use of dual-ported caches, the use of prefetch buffers, and/or the use of dynamic thread access policies. However, each of these conventional techniques suffers from significant problems and is therefore undesirable.

Dual-ported caches offer attractive properties in terms of independent operation of instruction cache reload and instruction fetch, but increase the area of instruction caches significantly. They also do not offer a solution for fetching from caching-inhibited storage, as such data must not be stored in the cache.

The use of prefetch buffers allows decoupling completion of memory subsystem response to a cache reload request and actual committing of the data to the cache by offering the ability to buffer several full cache lines and defer their writeback to a suitable time with respect to a thread being scheduled. Typically, prefetch buffers also offer bypass capabilities from the prefetch buffer to the instruction fetch logic, without requiring concurrent operation of the cache. However, this design choice increases the cost in terms of area due to the size and number of the prefetch buffers, the extra wiring necessary to bypass the prefetch buffers in an area of great congestion around and above an instruction cache array, and the additional levels of multiplexing needed to select from one of a plurality of prefetch buffers, as well as between prefetch buffers and instruction cache.

The use of a dynamic thread access pattern, as previously described, increases design complexity. Such increased design complexity, in turn, leads to increased design cost, longer timing paths and/or deeper pipelining, with the inherent degradation of architectural performance as expressed in CPI (cycles per instruction). In addition, the use of a dynamic thread access pattern increases both verification cost and design error susceptibility, and is therefore undesirable.

Accordingly, there exists a need for techniques for obtaining data in a manner which further increases microprocessor utilization and which does not suffer from one or more of the above-noted problems exhibited by conventional data fetching methodologies.

SUMMARY OF THE INVENTION

The present invention meets the above-noted need by providing, in illustrative embodiments thereof, a low-complexity methodology to afford efficient data return from a memory subsystem, thereby allowing data to be efficiently presented to a stalling thread expecting said data with minimum delay, while further allowing for instruction data associated with cache inhibited storage. Embodiments of the invention permit an optimal use of a single-ported instruction cache with an alternate fetching thread access pattern (which advantageously simplifies tight loops and permits deterministic bypassing). Techniques of the invention allow fetched data to align with fetch cycles so as to permit bypass operations during cache writeback, thereby avoiding degradation of instruction fetch performance due to contention for a single instruction cache port and beneficially increases microprocessor utilization compared to conventional approaches.

In accordance with one aspect of the invention, a method of obtaining data, comprising at least one sector, for use by at least a first thread wherein each processor cycle is allocated to at least one thread, includes the steps of: requesting data for at least a first thread; upon receipt of at least a first sector of the data, determining whether the at least first sector is aligned with the at least first thread, wherein a given sector is aligned with a given thread when a processor cycle in which the given sector will be written is allocated to the given thread; responsive to a determination that the at least first sector is aligned with the at least first thread, bypassing the at least first sector, wherein bypassing a sector comprises reading the sector while it is being written; responsive to a determination that the at least first sector is not aligned with the at least first thread, delaying the writing of the at least first sector until the occurrence of a processor cycle allocated to the at least first thread by retaining the at least first sector in at least one alignment register, thereby permitting the at least first sector to be bypassed.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a simplified flow diagram depicting an exemplary method for data alignment of instruction cache reload data relative to corresponding instruction fetch cycles of a requesting thread, in accordance with an embodiment of the invention.

FIG. 6 is a flow diagram depicting an exemplary data flow which may be used to implement the method shown in FIG. 5, in accordance with an embodiment of the invention.

FIG. 8 is a simplified state diagram showing an exemplary method which allows for the bypassing of a first sector (S0) regardless of whether S0 is initially aligned relative to a fetching thread, in accordance with an embodiment of the invention.

DETAILED DESCRIPTION OF THE INVENTION

Although the illustrative embodiments described herein include a simple setup comprising a single processor with a single cache each for instructions and data, and a single memory, the inventive techniques may be adapted for use with, for example, multiprocessor systems, multilevel caches, and/or a plurality of memories. Moreover, the inventive techniques herein described do not require the use of separate caches for instructions and data, or what is commonly known as the "Harvard architecture." Furthermore, although the illustrative embodiments described herein show only timeslices each comprising a single processor cycle, it is to be appreciated that alternative embodiments may incorporate multiple-cycle timeslices or timeslices of varying duration.

Moreover, although the illustrative embodiments described herein utilize a microprocessor in which instruction cache access is performed on a strictly alternating basis, wherein a first thread can use all even-numbered cycles, and a second thread can use all odd-numbered cycles to access an instruction cache, the inventive techniques may be used with any number of threads and any thread scheduling technique.

In the illustrative embodiments described herein, the instruction cache is assumed to be single-ported, thus permitting only a single access corresponding to either a read access (e.g., an instruction fetch) or write access (e.g., instruction cache reload) can be performed in a given timeslice. Because only a single cache port is provided for both instruction fetch and instruction cache reload (e.g., the servicing of previously discovered cache misses), when an instruction cache reload is serviced (i.e., data is returned from a memory hierarchy and written to the instruction cache in response to a prior cache miss), no instruction cache fetch can occur (i.e., no thread can fetch from the cache). These are not requirements for the use of the inventive techniques described herein and alternative arrangements may be utilized in conjunction with inventive techniques.

Likewise, although the illustrative embodiments are directed primarily toward instruction cache fetch and reloads, one having skill in the art could adapt the techniques described herein for use with, for example, data caches and/or combined caches.

Figure 1:
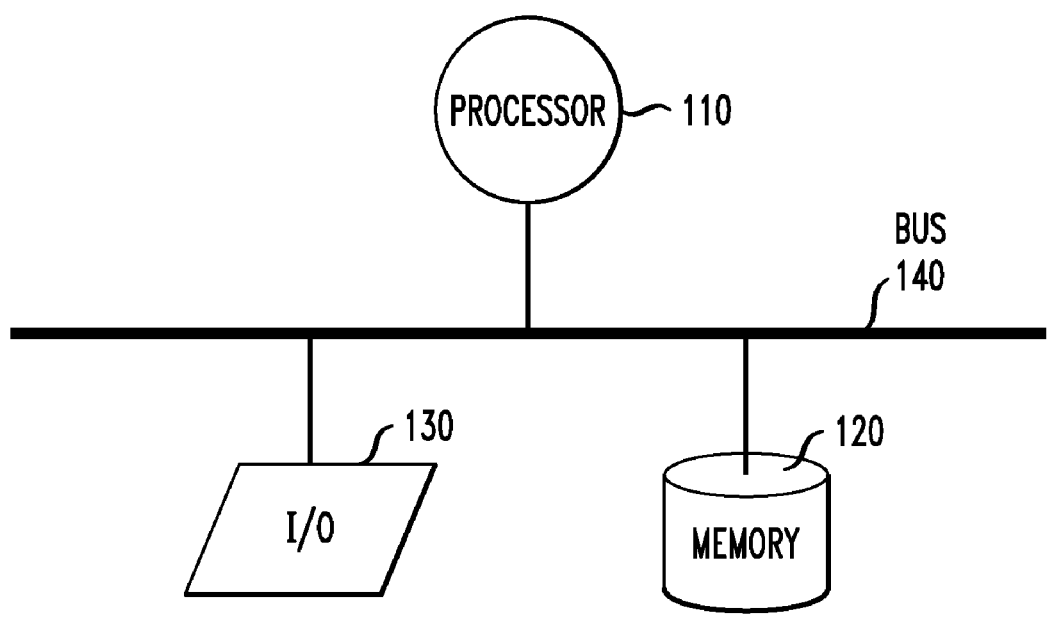
FIG. 1 is a simplified block diagram depicting an exemplary processing system in which techniques of the present invention may be implemented.

FIG. 1 is a simplified block diagram depicting an exemplary processing system 100 formed in accordance with an aspect of the invention. System 100 may include a processor 110, memory 120 coupled to the processor (e.g., via a bus 140 or alternative connection means), as well as input/output (I/O) circuitry 130 operative to interface with the processor. The processor 110 may be configured to perform at least a portion of the methodologies of the present invention, illustrative embodiments of which are shown in the accompanying figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 110. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

In a preferred embodiment, processor 110 is a multithreaded processor used in conjunction with at least one cache. For example, there may be an L1 (first level) instruction cache implemented at least in part in processor 110 and a L2 (second level) cache implemented at least in part in memory 120. Alternative arrangements and/or locations may be used in conjunction with inventive techniques; for example, both the L1 and L2 cache (known in some implementations as an L1.5 or intermediate cache) may be implemented in processor 110, with memory 120 serving as a L3 (third level) cache.

In a preferred embodiment, the L1 cache is implemented using a memory architecture which supports concurrent read and write indications, resulting in simultaneous read of the data being written to implement a cache bypass operation without additional data routing to accommodate bypass data signals. For example, an instruction cache may comprise an array of 6T SRAM cells with a single address provided in an address latch corresponding to a write data address. The techniques of the present invention do not require the use of any particular memory architecture.

Figure 2:
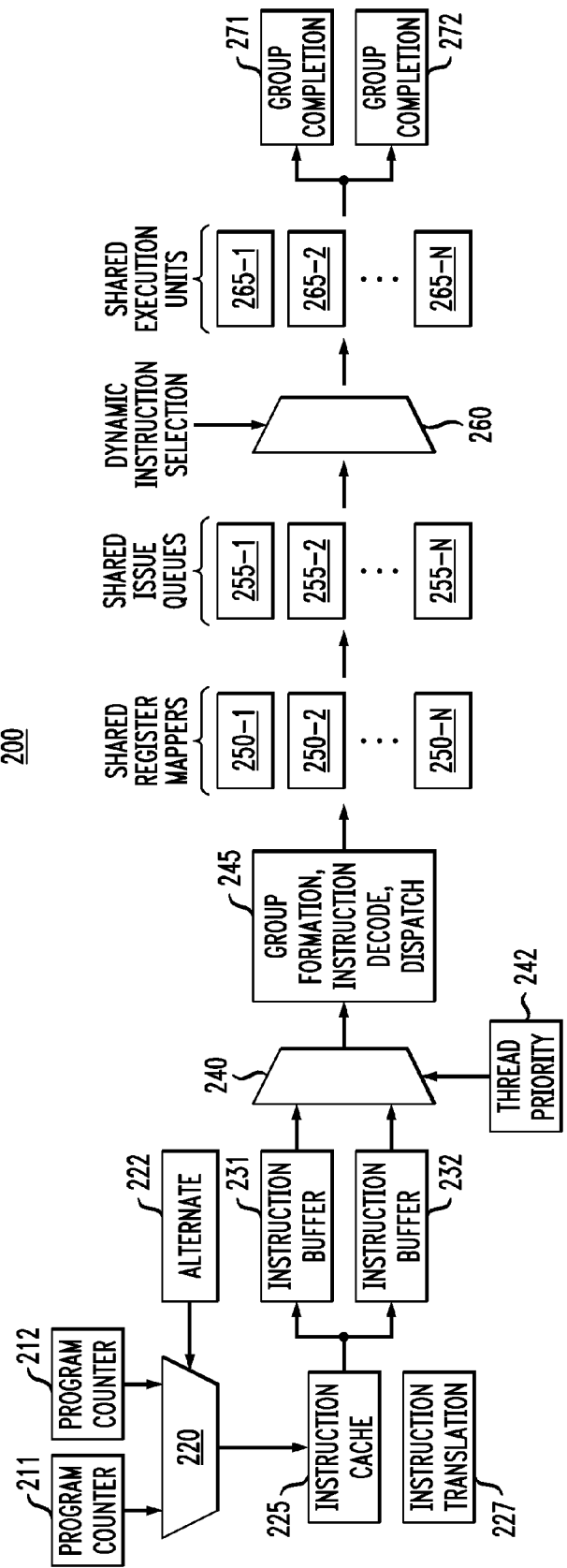
FIG. 2 illustrates an exemplary processor in which techniques of the present invention may be implemented.

Processor 110 is preferably, though not necessarily, a multithreaded processor such as exemplary processor 200 shown in FIG. 2. Processor 200 contains a plurality of instruction fetch address registers (IFARs) 211 and 212, also known as "program counters" or "fetch program counters," containing the next fetch addresses for a plurality of threads (e.g., T0 and T1, not shown in this figure). A fetch address is selected from the plurality of IFARs 211 and 212 using thread alternation multiplexer 220, which is controlled by thread selection signal "Alternate" 222. In the illustrative embodiment described herein, strict round-robin fetch is implemented by alternating thread selection signal 222. In other embodiments, the thread fetch policy may be dynamic, wherein the value of thread selection signal 222 may be based on a variety of factors, such as thread stalling status, thread priority etc.

Based on the selected address, instruction cache 225 is accessed and one or more units of data (such as a cache sector or a cache line) are fetched and translated by instruction translation 227, which may comprise, for example, an ERAT (effective to real address translation). This data, comprising at least a portion of one or more instructions, are stored in an instruction buffer 231 and 232 corresponding to the thread having been selected by thread alternation multiplexer 220. These instruction buffers may be physically distinct, or one physical instruction buffer may be dynamically or statically divided into multiple logical buffers.

Decode select multiplexer 240 selects instructions from instruction buffers 231 and 232 corresponding to the plurality of threads based on decode select signal 242. Decode select multiplexer 240 can use a variety of policies, based on resource utilization, stall status and thread priority. Instructions are processed by logic 245, which forms groups, decodes instructions, and dispatches instructions to be renamed using register mappers 250-1, 250-2, 250-N and queued in issue queues 255-1, 255-2, 255-N.

Instructions are selected from issue queues 255-1, 255-2, . . . 255-N based on dynamic instruction selection logic 260, and executed in a plurality of execution units 265-1, 265-2, . . . 265-N. Unlike program counters 211 and 212 and instruction buffers 231 and 232, each of each correspond to a thread, register mappers 250-1, 250-2, . . . 250-N; issue queues 255-1, 255-2, . . . 255-N; and execution units 265-1, 265-2, . . . 265-N are shared among by the threads. Instructions complete when all instructions in a group have finished and the group is next to complete 271 and 272.

Figure 3:
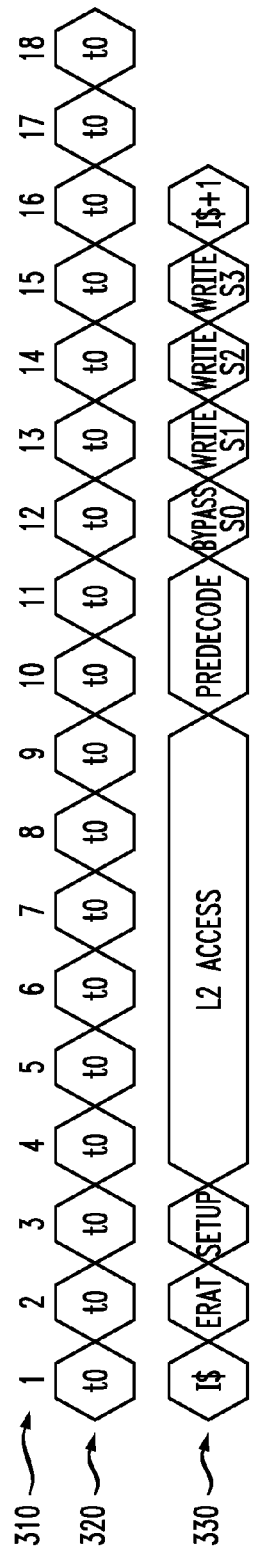
FIG. 3 is an exemplary timing diagram illustrating a conventional instruction fetch process, including a cache miss, for a single thread in a processor.

FIG. 3 is a timing diagram illustrating a conventional instruction fetch process, including a cache miss, for a single thread (t0) in a processor. This processor may be a single-threaded processor, or it may be a single-threaded operation of a hardware-multi-threaded processor, such as that shown in FIG. 2. Row 310 indicates sequential cycle numbers, row 320 indicates the active thread (here, always t0) and row 330 indicates the current operation.

In cycle 1, an instruction cache access is performed. Such an access typically includes access to one or more of an instruction cache array (I$), instruction directory array (IDIR), effective address directory array, and ERAT (effective to real address translation) or TLB (translation lookaside buffer) array is performed. In cycle 2, the IDIR tag is compared with the ERAT translation result to determine whether there is a cache hit or cache miss. In cycle 3, a cache miss has been detected and cache reload setup is performed to initiate a cache reload from a next level cache (such as an L1.5 or L2 cache).

A cache access (e.g., L2 access) can take a variable number of cycles due to arbitration delays associated with cache access arbitration for a variety of accesses, corresponding to instruction and data cache accesses for one or more cores, and coherence traffic corresponding to requests from remote cores. In this illustrative diagram, cache access is assumed to be six cycles, representing cycles 4-9.

In the exemplary embodiments described herein, a cache reload request reloads a cache line in four consecutive sectors denoted S0-S3. The four sectors may be transmitted starting at the lowest address or an algorithm referred to as "most critical sector first" is employed, wherein the initial request specifies which sector is needed first, and the sectors are transmitted in an order starting at the referenced sector.

When data returns, it is processed by predecode logic (shown to use an exemplary 2 cycles, numbers 10 and 11), after which a first sector S0 is written. The requested sector can be bypassed when it corresponds to the next fetch sector, as is the case here, in cycle 12.

In the typical scenario illustrated here, all four sectors arrive in pipelined fashion back to back and an additional 3 sectors S1-S3 are written consecutively after the first sector (cycles 13-15). In an alternative embodiment, additional sectors may be bypassed when said additional sectors are to be fetched and the sectors arrive while the next fetch address is active. After the last write cycle (I$), the next instruction cache fetch access (denoted as "I$+1") can be performed by the instruction fetch logic in cycle 16.

Figure 4:
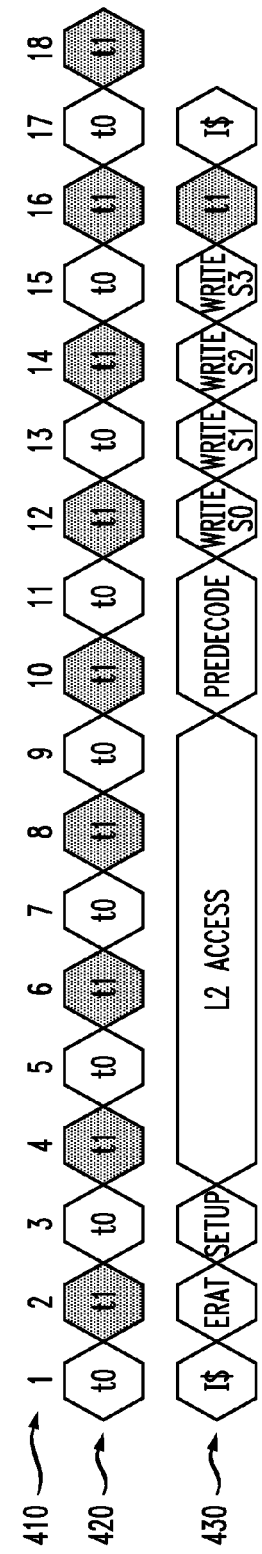
FIG. 4 is an exemplary timing diagram illustrating a conventional instruction fetch process as applied to a processor with dual hardware threads and a strictly alternating thread fetch policy.

FIG. 4 illustrates a conventional technique similar to that used in FIG. 3 as applied to a processor with dual hardware threads and a strictly alternating thread fetch policy. In accordance with this policy, alternating cycles (shown in row 410) are available for a first thread t0, and a second thread t1, as shown in row 420.

In cycle 1, an instruction cache access for thread t0 typically includes accesses to one or more of an instruction cache array (I$), instruction directory array (IDIR), effective address directory array, and ERAT (effective to real address translation) or TLB (translation lookaside buffer) array. In cycle 2, the IDIR tag is compared with the ERAT translation result to determine whether there has been a cache hit or cache miss. In cycle 3' a cache miss has been detected and cache reload setup is performed to initiate a cache reload from a next level cache (such as an L1.5 or L2 cache).

As above, the cache access can take a variable number of cycles, here it is assumed to be six cycles, representing cycles 4-9. Likewise, as instruction cache reload data returns, they are processed by predecode logic shown to require an exemplary 2 cycles (cycles 10 and 11), and subsequently written to the instruction cache.

In the exemplary instruction cache miss sequence, the instruction cache reload delay is of a nature to write the result in a cycle corresponding to a fetch by thread t1 (here, cycle 12). Because instruction fetch for thread t0 cannot occur during a cycle allocated for thread t1, sector S0 is written to the instruction cache, but not bypassed. In cycle 13, a consecutive sector S1 is written to the instruction cache. While this cycle corresponds to thread to, and would allow a bypass operation to occur, the thread t0 is trying to fetch instructions corresponding to sector S0 returned in cycle 12 (and corresponding typically to the operation of the most critical sector first algorithm) and therefore a bypass operation cannot occur successfully. The same scenario occurs during the following two cycles, cycles 13 and 14, where sectors S2 and S3 are written. Then, because of strict alternation, another cycle (16) allocated to t1 occurs, followed by the first cycle (17) available for fetching the data returned in the first data return cycle, for a total penalty of 5 cycles relative to when the data would have been available had a bypass been available in cycle 12.

This scenario is optimistic, as additional instruction cache reload data returning from the next level cache, such as those corresponding to an optional prefetch request, data corresponding to at least one other thread's demand fetch, and at least one other thread's optional prefetch, may delay the first instruction fetch read cycle by significantly more than 5 cycles.

FIG. 5 is a simplified flow diagram depicting an exemplary method 500 for data alignment of instruction cache reload data relative to corresponding instruction fetch cycles of a requesting thread, in accordance with an embodiment of the present invention. The method starts with step 510. In step 520, a test is performed to determine if instruction cache reload data is aligned relative to the requesting thread. Those skilled in the art will understand that a variety of determination functions can be used to implement the test step 520 within the scope of the claimed invention.

When the test performed in step 520 indicates proper alignment, control passes to step 530. In step 530, instruction cache reload data is written to the cache and a bypass operation is performed. The method then completes in step 540. However, when the test performed in step 520 indicates that instruction cache reload data is not properly aligned relative to the requesting thread, then method 500 instead proceeds to step 550.

In step 550, data is aligned relative to the requesting thread, preferably by delaying data write until the next cycle, although alternative data alignment techniques are similarly contemplated. In step 560, instruction cache reload data is written to the cache and a bypass operation is performed. The method 500 then completes in step 570.

FIG. 6 is a flow diagram depicting an exemplary data flow which may be used to implement the method 500 shown in FIG. 5, in accordance with an embodiment of the invention. Control logic 610 preferably implements a data alignment methodology, which may be similar to step 520 of method 500. Control logic 610 preferably receives information associated with cache reload data returning from a next cache hierarchy level 630 via flow 608, as well as thread fetch scheduling information 660, via flow 609, to determine the necessity of performing an alignment step. Cache reload data (flows 602, 604 and 608) optionally includes, but is not limited to, sector address and thread id of the cache reload data.

Control logic 610 is further operative, through data flow 601, to cause data return alignment register 615 to latch instruction cache reload data (represented as data flow 602). Control logic 610 also controls, via data flow 603, the selection 605 made by data source multiplexer 620 selecting between a first non-delayed version of data 604 as returned by next cache hierarchy level 630 (e.g., an L1.5 or L2 cache) in response to an instruction cache reload request and delayed data 606 stored in data return alignment register 615. The output selection 605 of multiplexer 620 is latched in a pipeline latch register 625, before being written to the instruction cache 640 (represented as data flow 607).

Figure 7A:
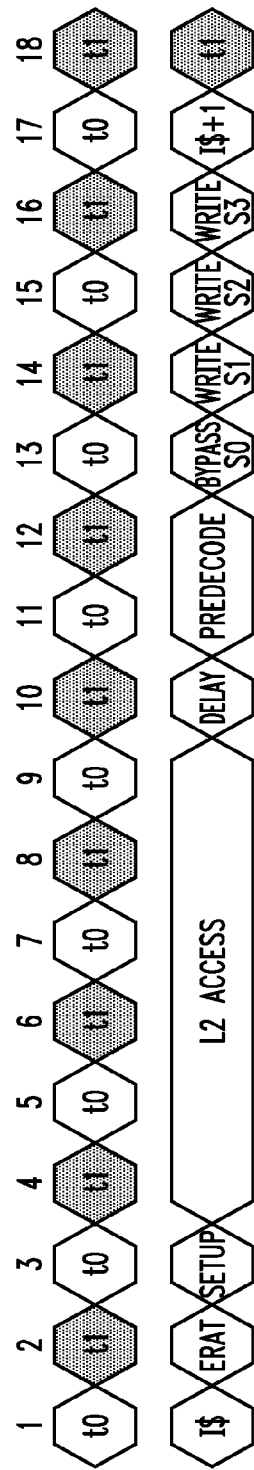
FIGS. 7A and 7B are exemplary timing diagrams depicting versions of a cache reload sequence, illustrated in conjunction with the illustrative processor shown in FIG. 2, which incorporate techniques according to the present invention.
Figure 7B:
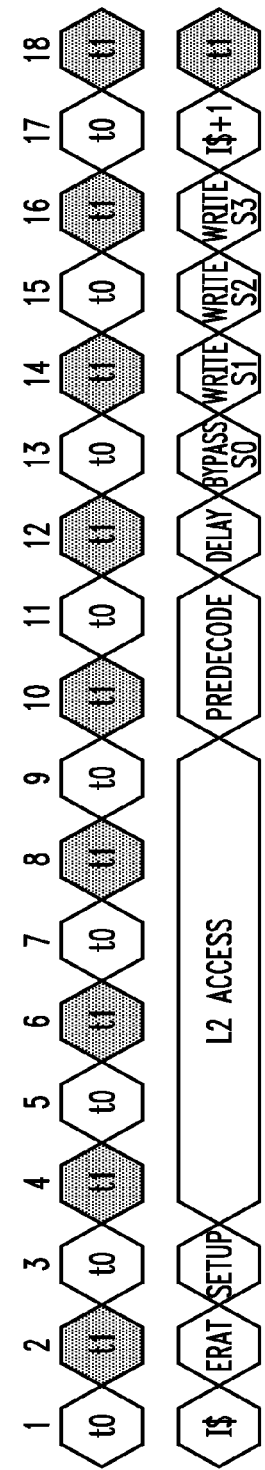

FIGS. 7A and 7B are exemplary timing diagrams depicting respective versions of a cache reload sequence, illustrated in conjunction with the exemplary processor 200 shown in FIG. 2, which incorporate inventive techniques, such as, but not limited to, method 500 and data flows 600. In both FIGS. 7A and 7B, in cycle 1, an instruction cache access for thread to includes accesses to one or more of an instruction cache array (IS), an instruction directory array (IDIR), an effective address directory array, and an ERAT (effective to real address translation) or TLB (translation lookaside buffer)

array. In cycle 2, an IDIR tag is compared with an ERAT translation result to determine whether there has been a cache hit or a cache miss. In cycle 3, a cache miss has been detected and therefore a cache reload setup is performed to initiate a cache reload from a next level cache (such as an L1.5 or L2 cache). As above, the cache access (L2 access) can take a variable number of cycles; here it is assumed to be six cycles, representing cycles 4-9.

With specific reference to FIG. 7A, a single delay cycle (cycle 10) has been inserted immediately after the data return from the next level cache (cycle 9), and before the operation of predecode cycles (cycles 11 and 12). This embodiment generally requires that a determination step (e.g., step 520 in FIG. 5, implemented by control logic 610 in FIG. 6) uses a single bit test to determine whether the cache reload data corresponds to the thread which will have instruction fetch read and bypass access to the cache in the cycle that the returning data will be written to the cache. To accomplish such a test, each reload data return (e.g., flows 602, 604 and 606 shown in FIG. 6) preferably incorporates the requester thread id.

With specific reference to FIG. 7B, a single delay cycle (cycle 12) has been inserted after the predecode cycles (cycles 10 and 11), and before the first instruction cache write cycle (cycle 13). By deferring inserting the delay cycle to a later stage in the processing pipeline for instruction cache reload data, the determination step (e.g., step 520 in FIG. 5, implemented by control logic 610 in FIG. 6) can include more sophisticated tests to determine whether to insert a data alignment cycle, e.g., comparing the data return address with a plurality of IFARs to determine whether any of the IFARs corresponding to the plurality of hardware threads present in a processor corresponds to the instruction cache reload address.

In both FIGS. 7A and 7B, the introduction of the one cycle delay in cycles 10 or 12, respectively, prior to the cycle in which a sector S0 would be written, delays this operation from cycle 12 (which is assigned to thread t1) to cycle 13 (which is assigned to thread t0). Accordingly, sector S0 may be bypassed rather than written. Sectors S1-S3 are written in cycles 14-16, respectively. In cycle 17, because sector S0 was bypassed rather than written, the next instruction (or plurality of instructions), rather than the current instruction (or plurality of instructions), may be fetched from the instruction cache.

Those skilled in the art will appreciate that more than a single delay cycle can be inserted, and that a delay cycle can be inserted in yet other portions of a cache reload pipeline.

FIG. 8 is a simplified state diagram showing an exemplary method 800 which allows for the bypassing of a first sector (S0) regardless of whether S0 is initially aligned relative to a fetching thread (e.g., t0), in accordance with an embodiment of the invention. Method 800 begins in state 805, in which it is determined whether first sector S0 of fetch data associated with a thread (e.g., Tx) is properly aligned to facilitate a concurrent write and bypass operation in the instruction cache for that thread.

When the test performed in state 805 indicates proper alignment of fetch data (e.g., a fetch for thread Tx is returned in a slot in which that thread is active), method 800 proceeds to state 810. It should be noted that this branch preferably implements a method analogous to that shown in FIG. 3. In state 810, sector S0 is bypassed. In state 820, a second sector S1 is received and written to the instruction cache. In state 830, a third sector S2 is received and written to the instruction cache. In state 840, a fourth sector S3 is received and written to the instruction cache.

When improper data alignment is indicated in state 805 (e.g., a fetch for thread Tx is returned in a slot during which another thread, Ty, is active), method 800 instead proceeds to state 815. This branch preferably implements a method analogous to that shown in FIGS. 7A and 7B. In state 815, the returned first sector S0 is latched (retained) into a data return alignment register (DRAR), said register corresponding to latch 615 in one embodiment. In state 825, the returned second sector S1 is latched into the DRAR and the previously latched first sector S0 is bypassed. In state 835, the returned third sector S2 is latched and the previously latched second sector S1 is written into the instruction cache. In state 845, the returned third sector S2 is latched into the DRAR and the previously latched second sector S1 is written. In state 855, the returned fourth sector S3 is latched and the previously latched third sector S2 is written. In state 865, the previously latched fourth sector S3 is written.

Those skilled in the art will understand that in a preferred embodiment, state transitions are performed on every cycle, and that control data associated with a data return value is appropriately staged to coincide with instruction data being staged. Furthermore, a number of exceptional conditions, such as a sector not returning in an expected cycle, a sector belonging to an alternate sequence being interspersed, and so forth, can occur and are preferably handled with additional states.

Figure 9:
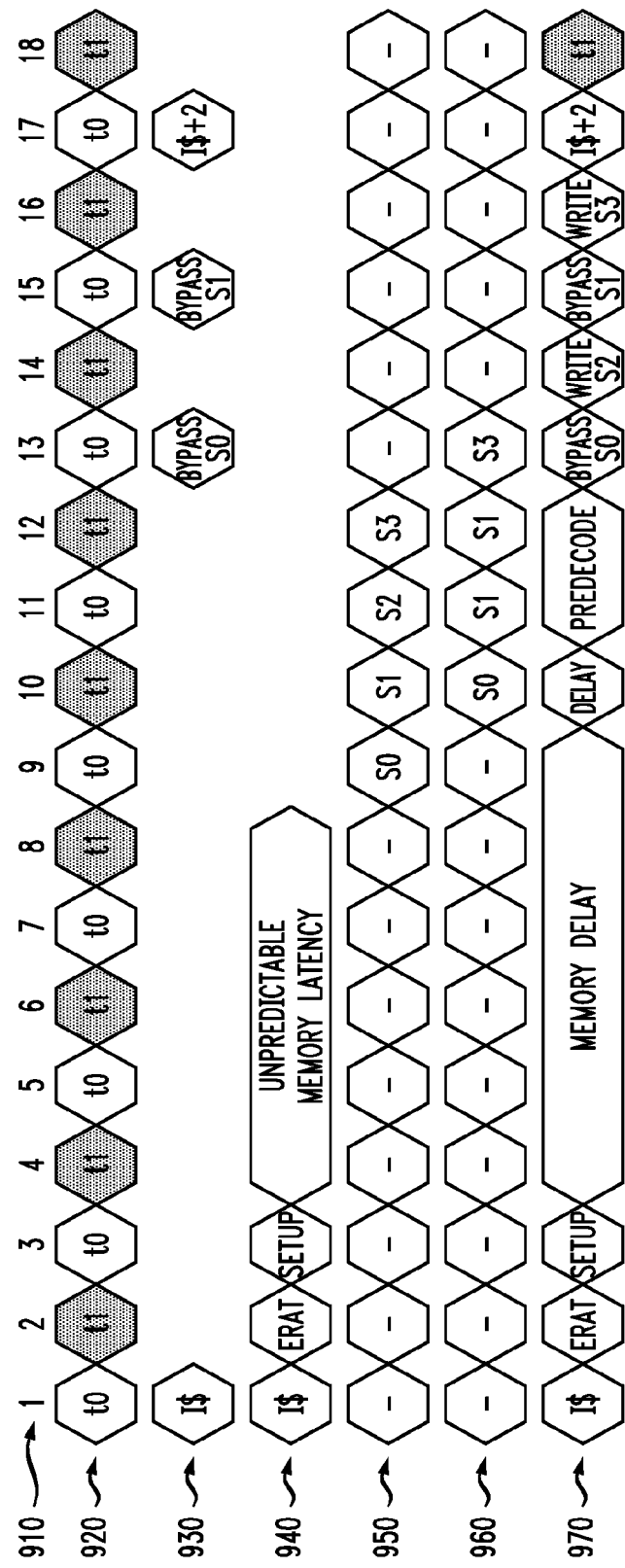
FIG. 9 is an exemplary timing diagram depicting the operation of an improved bypass method optimized to allow the bypassing of multiple write requests to instruction fetch cycles of a hardware thread in a processor with hardware multithreading, in accordance with an embodiment of the invention.

By way of example and without loss of generality, FIG. 9 is an exemplary timing diagram depicting the operation of an improved bypass method optimized to allow the bypassing of multiple write requests to instruction fetch cycles of a hardware thread in a processor with hardware multithreading, in accordance with an embodiment of the invention. For each of the cycles shown in row 910, the diagram includes the alternating thread which is active for instruction fetch (row 920), the operation of instruction fetch logic (row 930), the handling of memory requests (row 940), the contents of data returning from the next level cache (row 950), the contents of data return alignment register (row 960), and a summary representation of the cache miss handling (row 970).

Sectors are indicated as S0, S1, S2, S3 representing the first, second, third and fourth data sector returning. It should be noted that the illustrated bypassing is dependent on sequential sectors in the data return order to be sequentially ascending sectors corresponding to the execution flow. This can be disrupted by a number of events, such as wrap around of sectors to deliver a number of sectors corresponding to sectors preceding the first sector. This may occur when a most critical sector first algorithm is used and the critical sector is towards the end of a line, or the execution of branch instruction, resolution of branch instructions, or the handling of exceptions or interrupts by the processor.

The cache reload request spends an unpredictable number of cycles in the memory hierarchy. In the exemplary sequence shown, the first sector S0 is returned by the next cache hierarchy level in cycle 9. A determination is made by an alignment method that a delay cycle is necessary to align the returning data sector S0, and it is latched in data return alignment register.

In cycle 10, the data sector S1 is returned by the next cache hierarchy level. The alignment method transmits the stored S0 sector from data return alignment register to the predecode logic, and retains sector S1 in the DRAR.

In cycle 11, the data sector S2 is returned by the next cache hierarchy level. To allow the bypass of sector S1, which will likely be required two cycles after S0, sector S2 is passed to predecode, and S1 is retained in the DRAR.

In cycle 12, the data sector S3 is returned by the next cache hierarchy level. To allow bypass of sector S1 two cycles after data sector S0, sector S0 is passed to predecode, and data sector S3 is stored in the DRAR.

In cycle 13, sector S3 is passed to predecode, and sector S0 is bypassed. In cycle 14, sector S2 is written. In cycle 15, sector S2 is bypassed. In cycle 16, sector S3 is written. In cycle 17, the first non-bypassed fetch request can be performed. This may correspond to either a sequential fall-thru from a sector (e.g., S2), to a target of a branch before S0, or S1, or an exception handler or any of many other redirects.

It will become apparent to those skilled in the art that for bypass cycles, hit logic should be adapted to cope with a bypassed value which may or may not correspond to the instruction fetch address register value at the time of the bypass operation.

Figure 10:
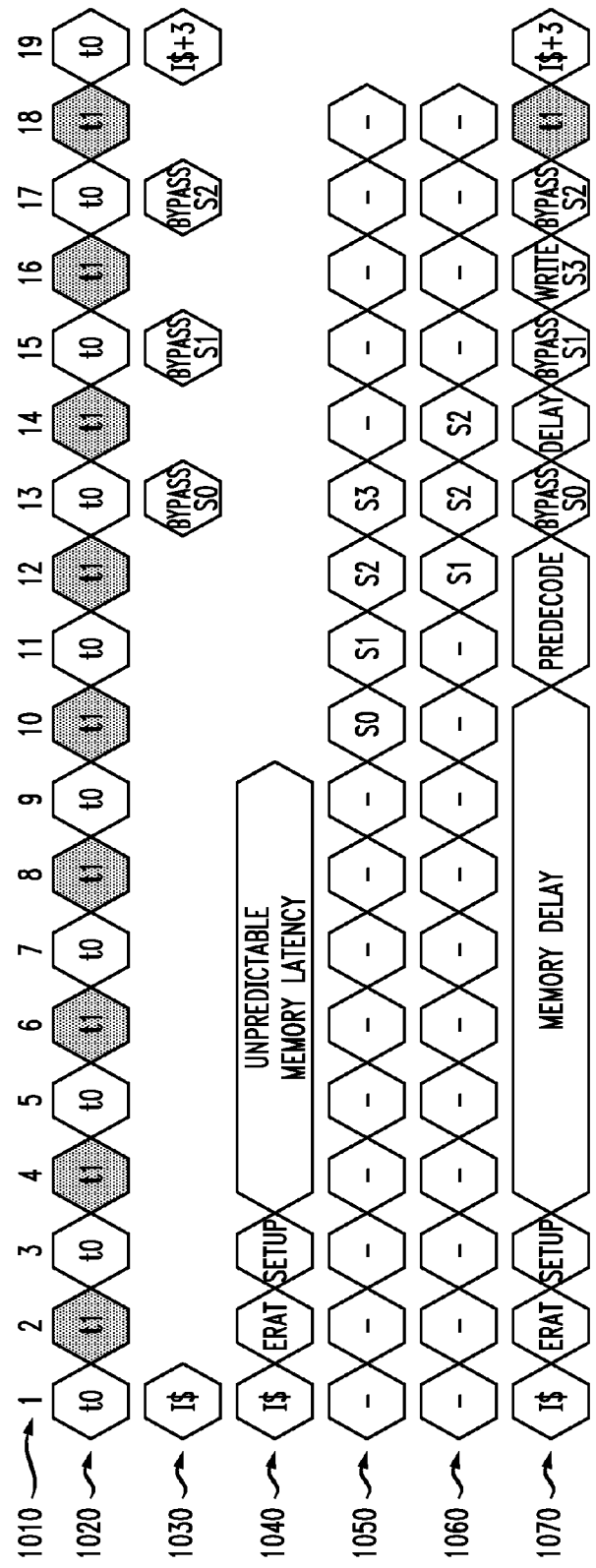
FIG. 10 is an exemplary timing diagram depicting an alternate data return alignment method, in accordance with an embodiment of the invention.

FIG. 10 is an exemplary timing diagram depicting an alternate data return alignment method, in accordance with an embodiment of the invention. Specifically, FIG. 10 shows an alternate data return alignment method wherein the first sector S0 is properly aligned with respect to the timing of data return relative to thread-specific instruction fetch cycles, and the DRAR is used in conjunction with an alignment to bypass additional values such as sectors S1 and S2. For each of the cycles shown in row 1010, the diagram includes the alternating thread which is active (row 1020), the operation of instruction fetch logic (row 1030), the handling of memory requests (row 1040), the contents of data returning from the next level cache (row 1050), the contents of data return alignment register (row 1060), and a summary representation of the cache miss handling (row 1070).

A cache miss access is performed in cycle 1. ERAT and IDIR tag comparisons are performed in cycle 2, as discussed above, and a cache miss setup occurs in cycle 3. An unpredictable number of cycles is incurred in the memory hierarchy or cache access (herein cycles 4-9). The first sector S0 is returned in cycle 10. The sector is properly aligned relative to the requesting thread t0, and passed to predecode.

In cycle 11, sector S1 is returned. Sector S1 is latched in the DRAR. No value is passed to predecode.

In cycle 12, sector S2 is returned. Sector S2 is latched in the DRAR, and sector S1 is passed to predecode.

In cycle 13, sector S3 is returned. Sector S2 is retained in the DRAR and sector S3 is passed to predecode. Sector S0 is written to the cache and bypassed.

In cycle 14, sector S2 is passed to predecode. The cycle is not used for data writeback. This cycle may be made available for fetching by thread t1 or may be unused to reduce control complexity. Preferably, the method indicates to the cache function the presence of an inactive fetch cycle in order to allow de-energizing of the instruction cache and associated structures (including but not limited to IDIR).

In cycle 15, sector S1 is bypassed. In cycle 16, sector S3 is written. In cycle 17, sector S3 is bypassed and the writeback of the line concludes. Cycle 18 is available for thread t1, and cycle 19 is available for the third fetch following the original request.

Referring now to bypassing of sectors other than S0, those skilled in the art will understand that in one preferred bypass method, only sectors corresponding to ascending instruction addresses are bypassed. The number of ascending order sectors are known during fetch initiation, and hence a method can be suitably initialized to avoid timing-critical control logic. In such a method, when sector S0 corresponds to the last sector in a line, no additional sectors will be bypassed. When sector S0 to the sector preceding the last sector, at most one sector will be bypassed, etc.

Figure 11:
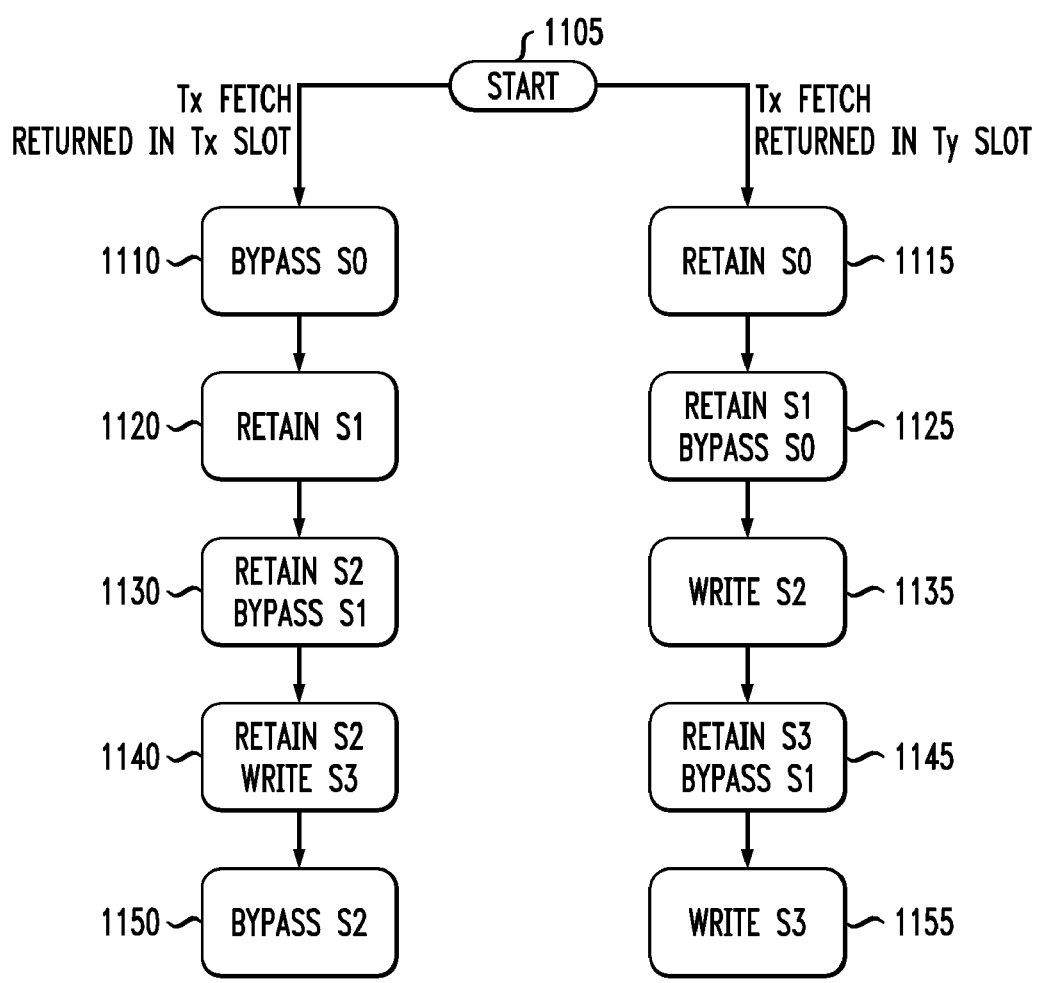
FIG. 11 is a simplified state diagram showing an exemplary method which allows for the bypassing of two sectors (S0 and S1) regardless of whether S0 is initially aligned relative to a fetching thread, in accordance with an embodiment of the invention.

FIG. 11 is a simplified state diagram showing a method 1100 according to inventive techniques. This method allows for the bypassing of two sectors (S0 and S2) regardless of whether S0 is initially aligned relative to a fetching thread (e.g., t0).

Method 1100 begins in state 1105, in which it is determined whether a first sector (S0) of fetch data associated with a thread (e.g., Tx) is properly aligned to facilitate a concurrent write and bypass operation in the instruction cache for that thread.

If the test indicates proper alignment (e.g., a fetch for thread Tx is returned in a slot in which that thread is active), the method proceeds to state 1110. It should be noted that this branch implements a method analogous to that shown in FIG. 10. In state 1110, a first sector S0 is bypassed. In state 1120, sector S1 is received and retained in a DRAR. In state 1130, sector S2 is received and retained in the DRAR while sector S1 is bypassed. In state 1140, sector S2 is still retained in the DRAR, while sector S3 is written to the instruction cache. In state 1150, sector S2 is bypassed.

If improper alignment is indicated (e.g., a fetch for a thread is returned in a slot in which that thread is not active and another thread Ty is active for fetch), the method instead proceeds to state 1115. This branch implements a method analogous to that shown in FIG. 10 for bypassing at least two sectors when the initial data return cycle does not correspond to the fetch cycle of the requesting thread. In state 1115, the returned first sector S0 is latched into a DRAR. In state 1125, the returned second sector S1 is latched into the DRAR and the previously latched first sector S0 is bypassed. In state 1135, the returned third sector S2 is written. In state 1145, the fourth sector S3 is latched into the DRAR and the previously latched second sector S1 is bypassed. In state 1155, the returned fourth sector S3 is written.

Those skilled in the art will understand that in a preferred embodiment, state transitions are performed on every cycle, and that all control data associated with a data return value is appropriately staged to coincide with instruction data being staged. Furthermore, a number of exceptional conditions, such as a sector not returning in an expected cycle, a sector belonging to an alternate sequence being interspersed, and so forth, can occur and are preferably handled with additional states.

Figure 12:
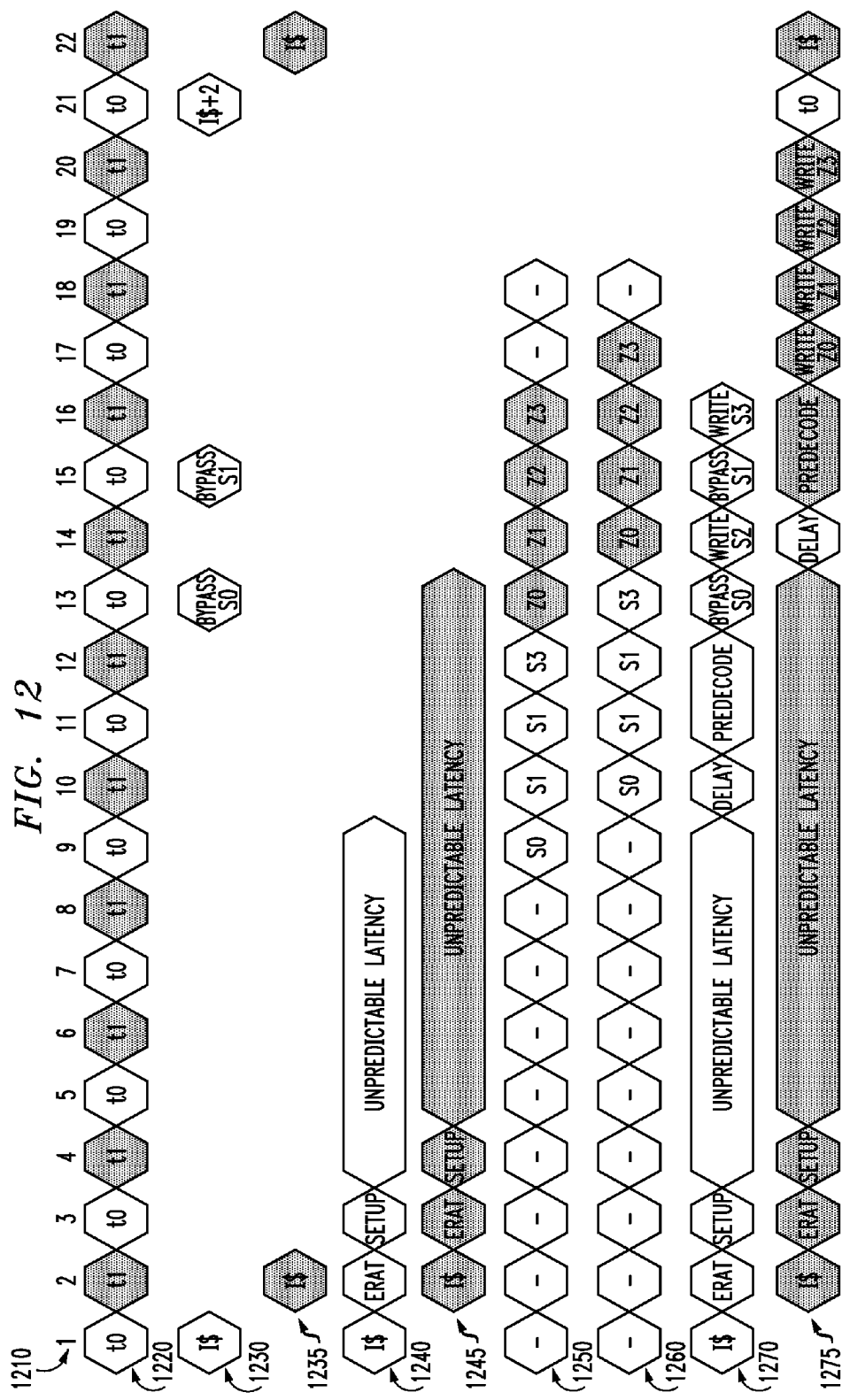
FIG. 12 is a timing diagram depicting an exemplary method for use with multiple clustered data return sequences, in accordance with an embodiment of the invention.

FIG. 12 is a timing diagram depicting an exemplary method for use with multiple clustered data return sequences. Specifically, there are two such clustered sequences, represented by a first data return sequence of sectors S0, S1, S2, S3 (which may be referred to herein collectively as sectors S), requested by thread to, and a second data return sequence of sectors Z0, Z1, Z2, Z3 (which may be referred to herein collectively as sectors Z), requested by thread t1. For each of the cycles shown in row 1210, the diagram includes the alternating thread which is active for fetch (row 1220), the operation of instruction fetch logic with regard to thread to and sectors S (row 1230) and with regard to thread t1 and sectors Z (row 1235), the handling of memory requests with regard to thread to and sectors S (row 1240) and with regard to thread t1 and sectors Z (row 1245), the contents of data returning from the next level cache (row 1250), the contents of the DRAR (row 1260), and a summary representation of the cache miss handling with regard to thread to and sectors S (row 1270) and with regard to thread t1 and sectors Z (row 1275).

Data return for sectors S0 through S3 corresponds loosely to FIG. 9, and the optimizations performed are in the spirit of the method of FIG. 9. Whereas Z is properly aligned with respect to a fetch slot for the requesting thread t1, it cannot proceed to be immediately predecoded and be made available for bypass, as its data return slot making it available for cache write and bypass in cycle 16 is already used by sector S3. Thus, because no two values can be on a bus at any one time, sectors Z0 through Z3 must necessarily be staged and written to the cache via a DRAR, or an alternative storage mechanism. However, those skilled in the art will understand that optimization is possible within sectors Z to allow sector Z0 to bypass in cycle 18 by writing sector Z1 prior to sector Z0, as shown previously in FIG. 9 with regard to sectors S.

Figure 13:
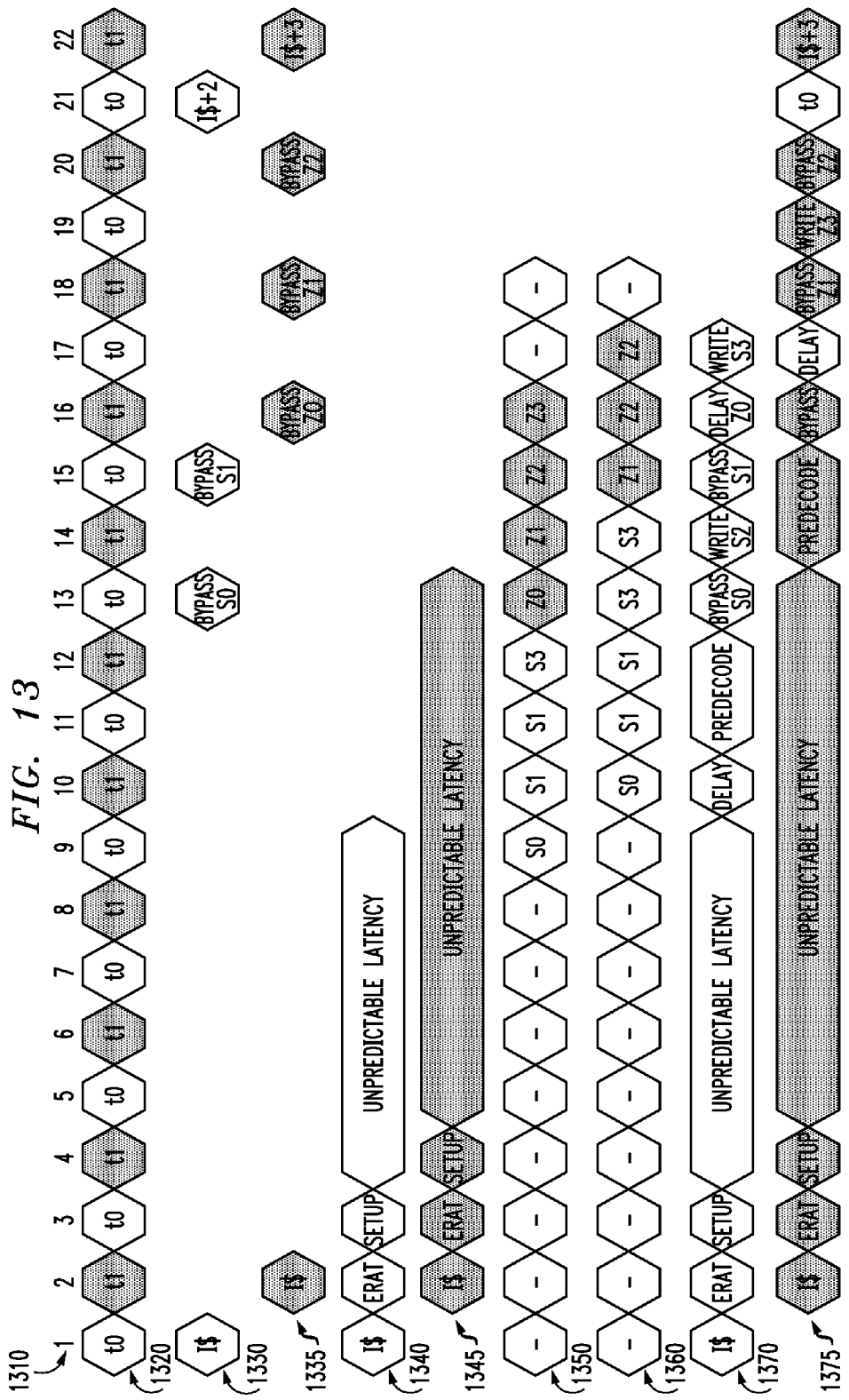
FIG. 13 is a timing diagram depicting another exemplary method for use with multiple clustered data return sequences, in accordance with an embodiment of the invention.

FIG. 13 is a timing diagram depicting another exemplary method for use with multiple clustered data return sequences, in accordance with an embodiment of the invention. FIG. 13 shows a method which performs essentially the same actions as the method of FIG. 12, until cycle 13.

For each of the cycles shown in row 1310, the diagram includes the alternating thread which is active for fetch (row 1320), the operation of instruction fetch logic with regard to thread to and sectors S (row 1330) and with regard to thread t1 and sectors Z (row 1335), the handling of memory requests with regard to thread to and sectors S (row 1340) and with regard to thread t1 and sectors Z (row 1345), the contents of data returning from the next level cache (row 1350), the contents of the DRAR (row 1360), and a summary representation of the cache miss handling with regard to thread t0 and sectors S (row 1370) and with regard to thread t1 and sectors Z (row 1375).

In cycle 13, sector Z0 returns for thread t1 and is properly aligned for bypass by thread t1. The method passes sector Z0 to the predecode logic and retains sector S3 in a DRAR. Sector S0 is written to the cache and bypassed for instruction fetch for thread to.

In cycle 14, sector Z1 returns from the memory hierarchy; the method passes sector S3 to predecode, and retains sector Z1. Sector S2 is written to the cache.

In cycle 15, sector Z2 returns from the memory hierarchy; the method passes sector Z1 to predecode and retains sector Z2 in the DRAR. Sector S1 is written to the cache and bypassed to instruction fetch of thread t0.

In cycle 16, sector Z3 returns from the memory hierarchy; the method passes sector Z3 and retains sector Z2 in the DRAR. Sector Z0 is written to the cache and bypassed to instruction fetch of thread t1.

In cycle 17, sector Z2 is passed to predecode. Sector S3 is written. In cycle 18, sector Z1 is written to the instruction cache and bypassed to the instruction fetch for thread t1. In cycle 19, sector Z3 is written. In cycle 20, sector Z2 is written to the instruction cache and bypassed to the instruction fetch for thread t1.

Cycle 21 is available for the second instruction fetch following the initial miss sector of thread t0. Cycle 22 is available for the third instruction fetch following the missed sector of thread t1.

Referring now to the operation of more complex sequences, such as instruction cache invalidates, coherence traffic and the like, in a preferred embodiment, any outstanding requests maintained in one or more DRARs are preferably completed before processing said invalidates or other coherence traffic requests. In another embodiment, the DRAR may be unconditionally invalidated and the coherence traffic can proceed immediately. Alternatively, address matching may be performed, and DRAR registers can be conditionally invalidated if they correspond to a coherence request.

An illustrative method for latching a return into a DRAR during the first cycle in which data is returned may begin with an indication to perform a write in 3 cycles initialized to '1'. With reference again to FIG. 6, if a first sector returns and its thread id (e.g., corresponding to information 608) does not match the thread id of the thread which will have access to the fetch logic in 3 cycles (e.g., corresponding to information 660), a bypass is initialized. An indicator is set to latch into a DRAR (e.g., corresponding to signal 601 for register 615). If the latch is already in use, a write will be performed to the cache to write the value previously held in the DRAR. A multiplexer select input (e.g., corresponding to signal 603 for multiplexer 620) is generated to select the value of the DRAR as the value to be written to the instruction cache. Otherwise, when the data return value is latched in the DRAR, and no prior value is in said DRAR, no write to the cache occurs. When the data for a first cycle can be bypassed without a stall cycle, a multiplexer select input (e.g., corresponding to signal 603 for multiplexer 620) is set to select the value returning from the memory hierarchy (e.g., corresponding to data from 630), and an indicator to latch into the DRAR (e.g., corresponding to signal 601 for register 615) is not set. This may be implemented, for example, using VHSIC (Very High-Speed Integrated Circuit) Hardware Description Language (VHDL) code similar to the following illustrative VHDL sequence:

```
indicate_valid_write_in_3 <= '1';
if (first_sector = '1' AND bypass_tid /= fetch_slot_in_3_tid) then
    latch_into_drar <= '1';
    if (drar_used) then
        mux_select_drar_input <= '1';
    else
        indicate_valid_write_in_3 <= '0'
    endif;
else
    latch_into_drar <= '0';
    mux_select_drar_input <= '0';
endif;
```

Those skilled in the art will contemplate logic for additional cycles based on the illustrative embodiments contained herein. Those skilled in the art will also understand that an optimized implementation will consider other scenarios, such as the handling of subsequent sectors following a first sector, back-to-back instruction fetch reloads, differentiating between prefetch and demand load requests, etc.

In another embodiment, decisions to align may be based on address comparisons of IFAR addresses, and incoming requests. In such an embodiment, the DRAR register is preferably implemented after predecode logic, or other instruction cache conditioning logic, allowing additional time for address comparisons and control logic to make decisions in accordance with the methods disclosed herein.

Figure 14:
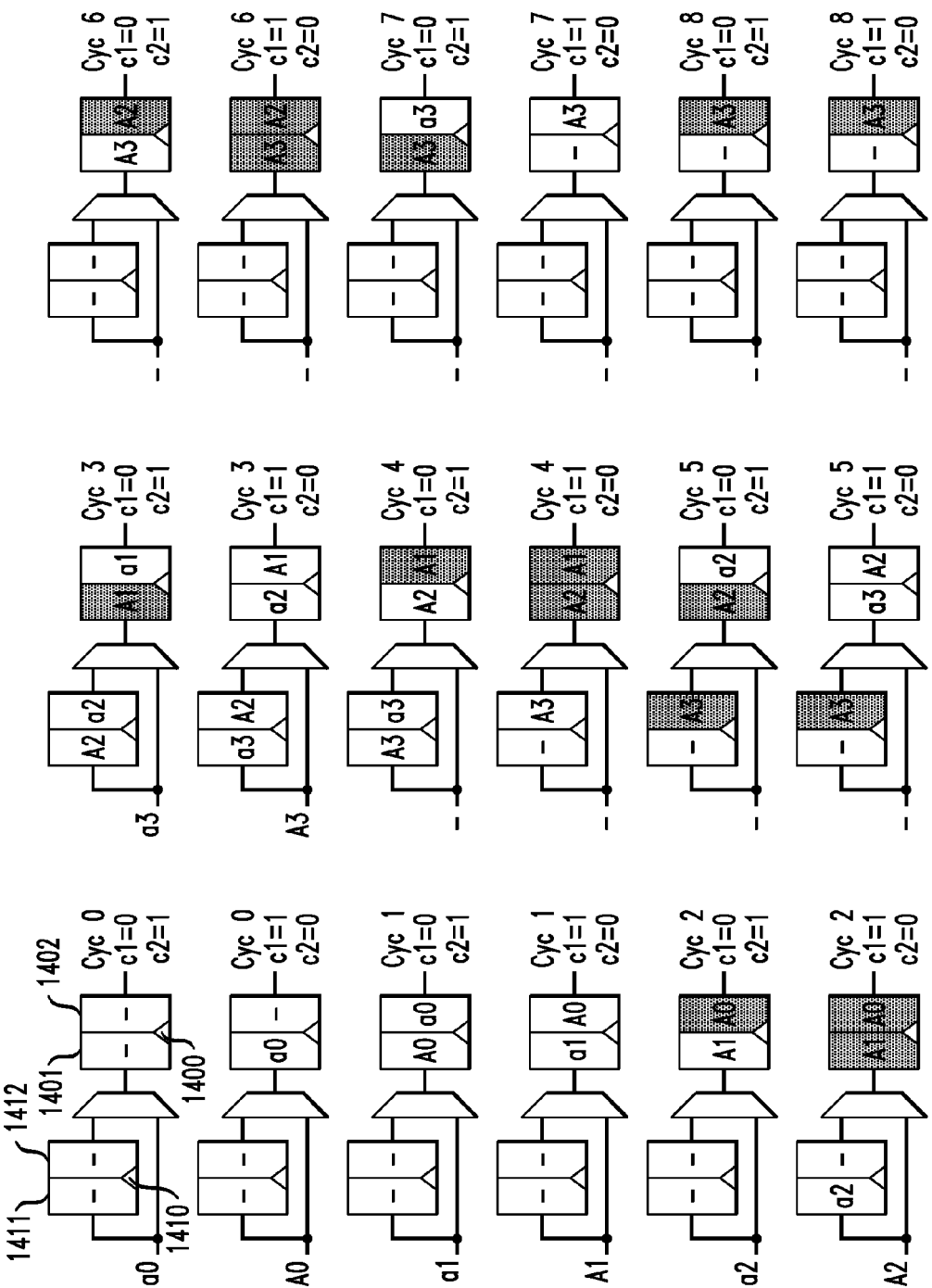
FIG. 14 is a block diagram depicting an exemplary elastic pipeline which permits bypassing of all four sectors, in accordance with an embodiment of the invention.

FIG. 14 is a block diagram depicting an exemplary elastic pipeline which permits bypassing of all four sectors, in accordance with an embodiment of the invention. As described in accordance with U.S. Pat. No. 7,065,665, the disclosure of which is incorporated by reference herein, a master/slave register in an elastic pipeline can store the equivalent of two separate data items. While a pipeline register is stalled, the master latch and the slave latch can each store one data item. This is possible without incurring any data races between data items as long as the two data items do not propagate downstream simultaneously. This technique can be used to double the storage capacity of the pipeline register and the alignment register enabling further alignment of sectors.

Referring to FIG. 14, in clock cycle 0, sector 0 (A0) arrives at the reload interface and is followed by three additional sectors (A1, A2, A3) over the next three consecutive cycles.

These four sectors each have to be aligned to their corresponding thread cycle, requiring sectors A0, A1, A2, and A3 to be delayed by one, two, three, and four cycles respectively.

In clock cycle 1 when c1=1 and c2=0, A0 is captured in the master latch of register 1400. Since A0 arrives on the wrong cycle to be bypassed, the slave latch 1402 of register 1400 has to be stalled for one clock cycle to align A0 to its thread cycle.

In clock cycle 2, while A0 is stalled in slave latch 1402, sector 1 (A1) is captured in master latch 1401 when c1=0 and c2=1. In order to bypass A1, it has to be stalled for a total of two clock cycles since it first has to wait for the delayed A1 sector to be aligned to its thread cycle, and then A1 itself has to stall for one additional clock cycle to be aligned to its own thread cycle. Register 1400 now holds two separate data items A0 and A1 in its master and slave latches enabling double storage capacity over a traditionally stalled register.

In clock cycle 3, A0 has been aligned to its thread cycle and is propagated to the next pipeline register (not shown). A1 is subsequently propagated to slave latch 1402 and captured. Since master latch 1401 cannot free up in time to capture a new data item this cycle, sector 2 (A2) is instead captured in the slave latch 1412 of alignment register 1410. A2 will have to stall for a total of three clock cycles to accommodate the delay due to the alignment of A0 and A1 as well as its own alignment to its thread cycle.

In clock cycle 4, A1 is stalled in slave latch 1402 and A2 propagates into master latch 1401 and is stalled. Sector 3 (A3) is captured in slave latch 1412 of the alignment register 1410.

In clock cycle 5, A1 has been aligned to its thread cycle and is propagated to the next pipeline register. A2 is propagated to slave latch 1402 and captured. A3 is stalled for one cycle in slave latch 1412.

In clock cycle 6, A2 is stalled in slave latch 1402. A3 propagates to master latch 1401 and is stalled.

In clock cycle 7, A2 has been aligned to its thread cycle and is propagated to the next pipeline register. A3 is propagated to slave latch 1402 and is captured.

In clock cycle 8, A3 is stalled in slave latch 1402.

In clock cycle 9 (not shown), A3 has been aligned to its thread cycle and is propagated to the next pipeline register. The use of elastic pipeline techniques has now enabled alignment of all four sectors to their respective thread cycles using only a single alignment register.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of obtaining data, comprising at least one sector, for use by at least a first thread wherein each processor cycle is allocated to at least one thread, the method comprising the steps of:

requesting data for at least a first thread;
    upon receipt of at least a first sector of the data, determining whether the at least first sector is aligned with the at least first thread, wherein a given sector is aligned with a given thread when a processor cycle in which the given sector will be written is allocated to the given thread;
    responsive to a determination that the at least first sector is aligned with the at least first thread, bypassing the at least first sector, wherein bypassing a sector comprises reading the sector while it is being written;
    responsive to a determination that the at least first sector is not aligned with the at least first thread, delaying the writing of the at least first sector until the occurrence of a processor cycle allocated to the at least first thread by retaining the at least first sector in at least one alignment register, thereby permitting the at least first sector to be bypassed.

2. The method of claim 1, further comprising a step of delaying the writing of at least a second sector of the data relative to at least a third sector of the data by storing the at least second sector in the at least one alignment register while the at least third sector is being written, thereby permitting the at least second sector to be bypassed.

3. The method of claim 2, wherein the method further comprises steps of:

responsive to a determination that the at least first sector of the data is aligned with the thread, performing the steps of:
        bypassing the at least first sector of the data;
        writing the at least second sector of the data;
        writing the at least third sector of the data; and
        writing at least a fourth sector of the data; and
    responsive to a determination that the at least first sector of the data is not aligned with the thread, performing the steps of:
        retaining the at least first sector of the data;
        retaining the at least second sector of the data;
        bypassing the at least first sector of the data;
        retaining the at least third sector of the data;
        writing the at least second sector of the data;
        retaining the at least fourth sector of the data;
        writing the at least third sector of the data; and
        writing the at least fourth sector of the data.

4. The method of claim 2, wherein the method further comprising the steps of:

responsive to a determination that the at least first sector of the data is aligned with the thread, performing the steps of:
        bypassing the at least first sector of the data;
        retaining the at least second sector of the data;
        retaining the at least third sector of the data;
        bypassing the at least second sector of the data;
        retaining the at least third sector of the data;
        writing at least a fourth sector of the data;
        bypassing the at least third sector of the data; and
    responsive to a determination that the first sector of the data is not aligned with the thread, performing the steps of:
        retaining the at least first sector of the data;
        retaining the at least second sector of the data;
        bypassing the at least first sector of the data;
        writing the at least third sector of the data;
        retaining the at least fourth sector of the data;
        bypassing the at least second sector of the data; and
        writing the at least fourth sector of the data.

5. The method of claim 1, further comprising the steps of:
    requesting data for at least a second thread;
    delaying the writing of at least one sector of the data requested for the at least first thread relative to at least one sector of the data requested for the at least second thread by retaining the at least one sector of data requested for the at least first thread in the at least one alignment register while the at least one sector of the data requested for the second thread is being written, thereby permitting the at least one sector of data requested for the second thread to be bypassed.

6. The method of claim 1 further including a step of invalidating retained data responsive to the receipt of a coherence request.

7. The method of claim 1 further comprising a step of delaying the processing of a coherence request until retained data has been written.

8. The method of claim 1, wherein the at least one alignment register comprises a plurality of alignment registers, wherein at least the first and the second alignment registers are pipeline latch registers each comprising a master latch and a slave latch.

9. The method of claim 8, comprising the steps of:
retaining the first sector of the data in the slave latch of the first alignment register;
retaining a second sector of the data in the master latch of the first alignment register;
bypassing the first sector of the data from the slave latch of the first alignment register;
moving the second sector of the data from the master latch of the first alignment register to the slave latch of the first alignment register;
retaining a third sector of the data in the slave latch of a second alignment register;
retaining the second sector of the data in the slave latch of the first alignment register;
moving the third sector of the data from the slave latch of the second alignment register to the master latch of the first alignment register;
retaining a fourth sector of the data in the slave latch of the second alignment register;
bypassing the second sector of the data from the slave latch of the first alignment register;
moving the third sector of the data from the master latch of the first alignment register to the slave latch of the first alignment register;
retaining the third sector of the data in the slave latch of the first alignment register;
moving the fourth sector of the data from the slave latch of the second alignment register to the master latch of the first alignment register;
bypassing the third sector of the data from the slave latch of the first alignment register;
moving the fourth sector of the data from the master latch of the first alignment register to the slave latch of the first alignment register;
retaining the fourth sector of the data in the slave latch of the first alignment register;
bypassing the fourth sector of the data from the slave latch of the first alignment register.

10. An apparatus comprising:
a memory; and
a processor coupled thereto, wherein the processor is operative to obtain data, comprising at least one sector, for use by at least a first thread wherein each processor cycle is allocated to at least one thread, by performing the steps of:
requesting data for at least a first thread;
upon receipt of at least a first sector of the data, determining whether the at least first sector is aligned with the at least first thread, wherein a given sector is aligned with a given thread when a processor cycle in which the given sector will be written is allocated to the given thread;
responsive to a determination that the at least first sector is aligned with the at least first thread, bypassing the at least first sector, wherein bypassing a sector comprises reading the sector while it is being written;
responsive to a determination that the at least first sector is not aligned with the at least first thread, delaying the writing of the at least first sector until the occurrence of a processor cycle allocated to the at least first thread by retaining the at least first sector in at least one alignment register, thereby permitting the at least first sector to be bypassed.

11. The apparatus of claim 10, wherein the processor is further operative to perform a step of delaying the writing of at least a second sector of the data relative to at least a third sector of the data by storing the at least second sector in an alignment register while the at least third sector is being written, thereby permitting the at least second sector to be bypassed.

12. The apparatus of claim 10, wherein the processor is further operative to perform the steps of:
responsive to a determination that the at least first sector of the data is aligned with the thread, performing the steps of:
bypassing the at least first sector of the data;
writing at least a second sector of the data;
writing at least a third sector of the data; and
writing at least a fourth sector of the data; and
responsive to a determination that the first sector of the data is not aligned with the thread, performing the steps of:
retaining the at least first sector of the data;
retaining the at least second sector of the data;
bypassing the at least first sector of the data;
retaining the at least third sector of the data;
writing the at least second sector of the data;
retaining the at least fourth sector of the data;
writing the at least third sector of the data; and
writing the at least fourth sector of the data.

13. The apparatus of claim 10, wherein the processor is further operative to perform the steps of:
responsive to a determination that the at least first sector of the data is aligned with the thread, performing the steps of:
bypassing the at least first sector of the data;
retaining at least a second sector of the data;
retaining at least a third sector of the data;
bypassing the at least second sector of the data;
retaining the at least third sector of the data;
writing at least a fourth sector of the data;
bypassing the at least third sector of the data; and
responsive to a determination that the first sector of the data is not aligned with the thread, performing the steps of:
retaining the at least first sector of the data;
retaining the at least second sector of the data;
bypassing the at least first sector of the data;
writing the at least third sector of the data;
retaining the at least fourth sector of the data;
bypassing the at least second sector of the data; and
writing the at least fourth sector of the data.

14. The apparatus of claim 10, wherein the processor is further operative to perform the steps of:
requesting data for use by at least a second thread;
delaying the writing of at least one sector of the data requested for the first thread relative to at least one sector of the data requested for the second thread by retaining the at least one sector of data requested for the first thread in the at least one alignment register while the at least one sector of the data requested for the second thread is being written, thereby permitting the at least one sector of data requested for the second thread to be bypassed.

15. The apparatus of claim 10, wherein the processor is Further operative to perform the step of invalidating retained data responsive to the receipt of a coherence request.

16. The apparatus of claim 10, wherein the processor is further operative to perform the step of delaying the processing of a coherence request until retained data has been written.

17. The apparatus of claim 10, wherein the at least one alignment register comprises a plurality of alignment registers, wherein at least the first and the second alignment registers are pipeline latch registers each comprising a master latch and a slave latch.

18. The apparatus of claim 17, wherein the processor is further operative to perform the steps of:
- retaining the first sector of the data in the slave latch of the first alignment register;
- retaining a second sector of the data in the master latch of the first alignment register;
- bypassing the first sector of the data from the slave latch of the first alignment register;
- moving the second sector of the data from the master latch of the first alignment register to the slave latch of the first alignment register;
- retaining a third sector of the data in the slave latch of a second alignment register;
- retaining the second sector of the data in the slave latch of the first alignment register;
- moving the third sector of the data from the slave latch of the second alignment register to the master latch of the first alignment register;
- retaining a fourth sector of the data in the slave latch of the second alignment register;
- bypassing the second sector of the data from the slave latch of the first alignment register;
- moving the third sector of the data from the master latch of the first alignment register to the slave latch of the first alignment register;
- retaining the third sector of the data in the slave latch of the first alignment register;
- moving the fourth sector of the data from the slave latch of the second alignment register to the master latch of the first alignment register;
- bypassing the third sector of the data from the slave latch of the first alignment register;
- moving the fourth sector of the data from the master latch of the first alignment register to the slave latch of the first alignment register;
- retaining the fourth sector of the data in the slave latch of the first alignment register;
- bypassing the fourth sector of the data from the slave latch of the first alignment register.

19. An article of manufacture comprising a machine-readable storage medium containing one or more software programs that, when executed, obtain data, comprising at least one sector, for use by at least a first thread wherein each processor cycle is allocated to at least one thread, by performing the steps of:
- requesting data for at least a first thread;
- upon receipt of at least a first sector of the data, determining whether the at least first sector is aligned with the at least first thread, wherein a given sector is aligned with a given thread when a processor cycle in which the given sector will be written is allocated to the given thread;
- responsive to a determination that the at least first sector is aligned with the at least first thread, bypassing the at least first sector, wherein bypassing a sector comprises reading the sector while it is being written;
- responsive to a determination that the at least first sector is not aligned with the at least first thread, delaying the writing of the at least first sector until the occurrence of a processor cycle allocated to the at least first thread by retaining the at least first sector in at least one alignment register, thereby permitting the at least first sector to be bypassed.

20. The article of claim 19, wherein the one or more programs are further operative to perform the step of delaying the writing of at least a second sector of the data relative to at least a third sector of the data by storing the at least second sector in an alignment register while the at least third sector is being written, thereby permitting the at least second sector to be bypassed.

21. The article of claim 19, wherein the one or more programs are further operative to perform the steps of:
- requesting data for use by at least a second thread;
- delaying the writing of at least one sector of the data requested for the first thread relative to at least one sector of the data requested for the second thread by retaining the at least one sector of data requested for the first thread in the at least one alignment register while the at least one sector of the data requested for the second thread is being written, thereby permitting the at least one sector of data requested for the second thread to be bypassed.

* * * * *